United States Patent
Hancock et al.

(10) Patent No.: US 12,433,672 B2
(45) Date of Patent: Oct. 7, 2025

(54) INTERFACE JOINT FOR INTERCONNECTING AN ELECTROSURGICAL GENERATOR AND AN ELECTROSURGICAL INSTRUMENT

(71) Applicant: CREO MEDICAL LIMITED, Monmouth (GB)

(72) Inventors: Christopher Paul Hancock, Bath (GB); Leif Geoghegan, Chepstow (GB); Rohan Monico, Chepstow (GB); Steve Morris, Chepstow (GB); Craig Gulliford, Chepstow (GB); Huw Hopkins, Chepstow (GB); Louis Turner, Chepstow (GB); Robert Pluta, Chepstow (GB)

(73) Assignee: CREO MEDICAL LIMITED, Chepstow (GB)

( * ) Notice: Subject to any disclaimer, the term of this patent is extended or adjusted under 35 U.S.C. 154(b) by 1182 days.

(21) Appl. No.: 17/294,218

(22) PCT Filed: Nov. 19, 2019

(86) PCT No.: PCT/EP2019/081735
§ 371 (c)(1),
(2) Date: May 14, 2021

(87) PCT Pub. No.: WO2020/104419
PCT Pub. Date: May 28, 2020

(65) Prior Publication Data
US 2022/0000554 A1   Jan. 6, 2022

(30) Foreign Application Priority Data
Nov. 20, 2018 (GB) ..................... 1818869

(51) Int. Cl.
A61B 18/18 (2006.01)
A61B 18/00 (2006.01)
A61B 90/00 (2016.01)

(52) U.S. Cl.
CPC .......... *A61B 18/1815* (2013.01); *A61B 90/03* (2016.02); *A61B 2018/00178* (2013.01);
(Continued)

(58) Field of Classification Search
CPC .......... A61B 2018/00011; A61B 2018/00053; A61B 2018/00166; A61B 2018/00172;
(Continued)

(56) References Cited

U.S. PATENT DOCUMENTS 6,221,039 B1 * 4/2001 Durgin ............... A61B 18/1492
606/48
2014/0358141 A1 12/2014 Simonsen et al.
(Continued)

FOREIGN PATENT DOCUMENTS

CN 108392294 A 8/2018
GB 2503673 A 1/2014
(Continued)

OTHER PUBLICATIONS

International Search Report and Written Opinion, issued by International Searching Authority in corresponding International Application No. PCT/EP2019/081735, mailed on Mar. 13, 2020.
(Continued)

*Primary Examiner* — Linda C Dvorak
*Assistant Examiner* — Bradford C. Blaise
(74) *Attorney, Agent, or Firm* — ArentFox Schiff LLP

(57) ABSTRACT

An interface joint for interconnecting an electrosurgical generator and an electrosurgical instrument, the interface joint comprising: a housing having: an inlet for receiving electromagnetic energy from the electrosurgical generator,
(Continued)

and an outlet; a slidable trigger on the housing, the slidable trigger being attached to a push rod that extends out of the housing through the outlet; and a single cable assembly for connecting the outlet to the electrosurgical instrument, the single cable assembly comprising a flexible sleeve that conveys the push rod and a coaxial cable that is connected to the inlet. The interface joint may include a reinforcement element coupled to a first portion of the push rod so as to reinforce the first portion. Additionally or alternatively, the interface joint may include a slide limiting mechanism coupled to the push rod and configured to limit a maximum slide distance of an internal tube over the push rod.

15 Claims, 10 Drawing Sheets

(52) U.S. Cl.
CPC .............. *A61B 2018/00196* (2013.01); *A61B 2018/00607* (2013.01); *A61B 2018/0091* (2013.01); *A61B 2018/1861* (2013.01); *A61B 2090/034* (2016.02)

(58) Field of Classification Search
CPC .......... A61B 2018/00178; A61B 2018/00196; A61B 2018/00607; A61B 2018/0091; A61B 2018/00946; A61B 2018/00982; A61B 2018/1425; A61B 18/18; A61B 18/1815; A61B 2018/1861
See application file for complete search history.

(56) References Cited

U.S. PATENT DOCUMENTS

2016/0324576 A1* 11/2016 Ebbutt ............... A61B 18/1815
2020/0121363 A1* 4/2020 Fu ...................... A61B 17/3478

FOREIGN PATENT DOCUMENTS

GB          2523246 A      8/2015
WO    WO 2016/059228 A2   4/2016

OTHER PUBLICATIONS

Search Report under Section 17(5), issued by the United Kingdom Intellectual Property Office in counterpart United Kingdom Application No. GB1818869.8, dated May 2, 2019.
Search Report under Section 17(6), issued by the United Kingdom Intellectual Property Office in counterpart United Kingdom Application No. GB1818869.8, dated Aug. 16, 2019.

* cited by examiner

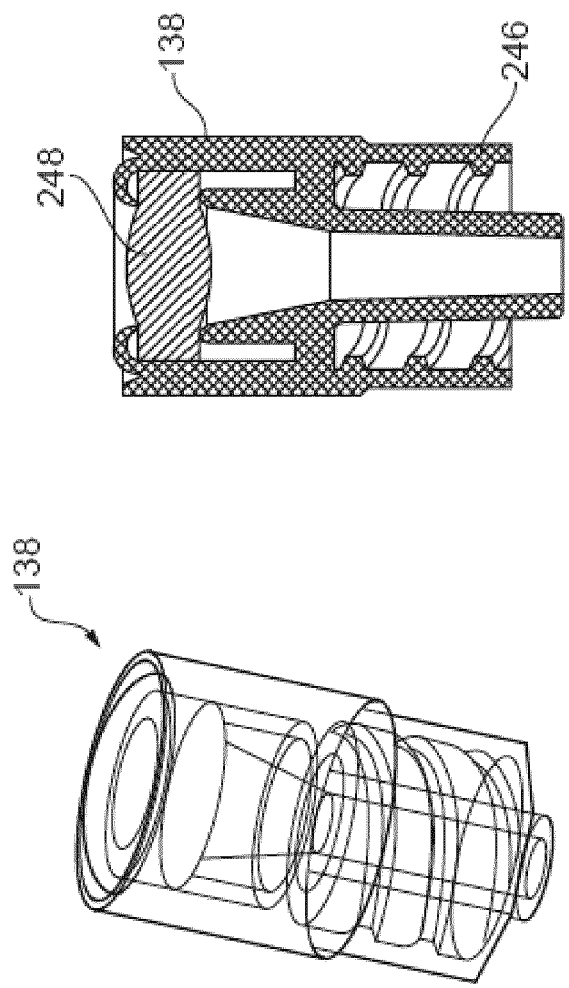

INTERFACE JOINT FOR INTERCONNECTING AN ELECTROSURGICAL GENERATOR AND AN ELECTROSURGICAL INSTRUMENT

CROSS-REFERENCE TO RELATED APPLICATIONS

This application is a National Stage entry of International Application No. PCT/EP2019/081735, filed on Nov. 19, 2019, which claims priority to United Kingdom Patent Application No. 1818869.8, filed on Nov. 20, 2018. The disclosures of the priority applications are hereby incorporated in their entirety by reference.

TECHNICAL FIELD

The invention relates to an interface joint for interconnecting an electrosurgical generator and an electrosurgical instrument. The electrosurgical instrument may be for delivering electromagnetic energy (e.g. radiofrequency and/or microwave energy) into biological tissue for cutting tissue and/or for haemostasis (i.e. promoting blood coagulation).

BACKGROUND TO THE INVENTION

Surgical resection is a means of removing sections of organs from within the human or animal body. Such organs may be highly vascular. When tissue is cut (divided or transected) small blood vessels called arterioles are damaged or ruptured. Initial bleeding is followed by a coagulation cascade where the blood is turned into a clot in an attempt to plug the bleeding point. During an operation, it is desirable for a patient to lose as little blood as possible, so various devices have been developed in an attempt to provide blood free cutting. For endoscopic procedures, bleeds are also undesirable, and need to be dealt with in an expedient manner, since the blood flow may obscure the operator's vision, which may prolong surgery and potentially lead to the procedure needing to be terminated and another method used instead, e.g. open surgery.

Electrosurgical generators are prevalent in hospital operating theatres, often for use in open and laparoscopic procedures, and increasingly for use with surgical scoping devices, e.g. an endoscope or the like. In endoscopic procedures the electrosurgical accessory is typically inserted through a lumen inside an endoscope. Considered against the equivalent access channel for laparoscopic surgery, such a lumen is comparatively narrow in bore and greater in length.

Instead of a sharp blade, it is known to use radiofrequency (RF) energy to cut biological tissue. The method of cutting using RF energy operates using the principle that as an electric current passes through a tissue matrix (aided by the ionic contents of the cells and the intercellular electrolytes), the impedance to the flow of electrons across the tissue generates heat. In practice, an instrument is arranged to apply an RF voltage across the tissue matrix that is sufficient to generate heat within the cells to vaporise the water content of the tissue. However, as a result of this increasing desiccation, particularly adjacent to the RF emitting region of the instrument (which has the highest current density of the current path through tissue), direct physical contact between the tissue and instrument can be lost. The applied voltage then manifests itself as a voltage drop across this small void, which causes ionisation in the void that leads to a plasma. Plasma has a very high volume resistivity compared with tissue. The energy supplied to the instrument maintains the plasma, i.e. completes the electrical circuit between the instrument and the tissue. Volatile material entering the plasma can be vaporised and the perception is therefore of a tissue dissecting plasma.

GB 2 523 246 describes an electrosurgical instrument for applying to biological tissue RF electromagnetic energy and/or microwave frequency EM energy. The instrument comprises a shaft insertable through an instrument channel of a surgical scoping device. At a distal end of the shaft there is an instrument tip comprising a planar transmission line formed from a sheet of a first dielectric material having first and second conductive layers on opposite surfaces thereof. The planar transmission line is connected to a coaxial cable conveyed by the shaft. The coaxial cable is arranged to deliver either microwave or RF energy to the planar transmission line. The coaxial cable comprises an inner conductor, an outer conductor coaxial with the inner conductor, and a second dielectric material separating the outer and inner conductors, the inner and outer conductors extending beyond the second dielectric at a connection interface to overlap opposite surfaces of the transmission line and electrically contact the first conductive layer and second conductive layer respectively. The instrument further comprises a protective hull with a smoothly contoured convex undersurface facing away from the planar transmission line. The undersurface comprises a longitudinally extending recessed channel formed therein. A retractable needle is mounted within the instrument, and operable to extend through the recessed channel to protrude from a distal end of the instrument. The needle can be used to inject fluid into a treatment zone before the RF or microwave energy is applied.

GB 2 523 246 also describes an interface joint for integrating into a single cable assembly all of (i) a fluid feed, (ii) a needle movement mechanism, and (iii) an energy feed (e.g. a cable supplying RF and/or microwave energy). The cable assembly may be sized to fit through the instrument channel of a conventional endoscope. More specifically, the interface joint includes: a housing made of electrically insulating material, the housing having: a first inlet for receiving radio-frequency (RF) electromagnetic (EM) energy and/or microwave frequency EM energy from the electrosurgical generator, a second inlet for receiving fluid, and an outlet; a single cable assembly for connecting the outlet to the electrosurgical instrument, the signal cable assembly comprising a flexible sleeve that defines a fluid flow path that is in fluid communication with the second inlet, and which conveys a coaxial cable that is connected to the first inlet. Also, the interface joint may include a slidable trigger on the housing, the slidable trigger being attached to a push rod that extends out of the housing through the outlet.

SUMMARY OF THE INVENTION

At its most general, the present invention provides a development to the interface joint concept discussed in GB 2 523 246. The development may include reinforcing the push rod. In this way, the chance of damage to the push rod and its resultant malfunction may be reduced.

Additionally, the flexible sleeve may include an internal tube which surrounds the push rod, and which is free to slide with respect to the push rod. The development may include limiting a maximum slide distance of the internal tube over the push rod. In this way, the chances of damage to the internal tube and its resultant malfunction can be reduced.

An aspect of the invention provides an interface joint for interconnecting an electrosurgical generator and an electrosurgical instrument, the interface joint comprising: a housing having: an inlet for receiving electromagnetic energy from the electrosurgical generator, and an outlet; a slidable trigger on the housing, the slidable trigger being attached to a push rod that extends out of the housing through the outlet; and a single cable assembly for connecting the outlet to the electrosurgical instrument, the single cable assembly comprising a flexible sleeve that conveys the push rod and a coaxial cable that is connected to the inlet.

The interface joint may also include a second inlet for receiving fluid. Also, the flexible sleeve may define a fluid flow path that is in fluid communication with the second inlet. As such, the aforementioned inlet for receiving electromagnetic energy may be termed the "first" inlet.

The electromagnetic energy may comprise radiofrequency (RF) energy and/or microwave frequency energy. The electrosurgical generator may be any device capable of delivery RF EM energy or microwave frequency EM energy for treatment of biological tissue. For example, the generator described in WO 2012/076844 may be used.

The electrosurgical instrument may be any device which in use is arranged to use RF EM energy or microwave frequency EM energy for the treatment of biological tissue. The electrosurgical instrument may use the RF EM energy and/or microwave frequency EM energy for any or all of resection, coagulation and ablation. For example, the instrument may be a resection device as disclosed herein, but alternatively may be any of a pair of microwave forceps, a snare that radiates microwave energy and/or couples RF energy, and an argon beam coagulator.

The interface joint may include a reinforcement element (or structure) coupled to a first portion of the push rod so as to reinforce the first portion. The first portion may be located partly or completely inside the housing. Additionally, the first portion may be partly inside (i) the outlet, (ii) the single cable assembly, or (iii) both. For example, when the slidable trigger is actuated so as to fully retract the push rod, the reinforcement element maybe located only inside the housing, e.g. not inside the outlet or the single cable assembly (or flexible sleeve). Additionally or alternatively, when the slidable trigger is actuated so as to fully extend the push rod, the reinforcement element maybe located inside the housing and the outlet and, possibly, the single cable assembly (and flexible sleeve). In this way, the push rod may be strengthened and supported whilst located in free space of the housing. In turn, the operation of the slidable trigger in extending and retracting the push rod is made more reliable because the push rod is less susceptible to bending and other damage. Consequently, the operation of the slidable trigger in manipulating the push rod is made more consistent and, thereby, easier to control by a user. For example, the reinforcement element is a support tube surrounding the first portion. The support tube may be made of stainless steel. Also, the support tube may be fixed to the first portion to prevent relative movement between the support tube and first portion. In an embodiment, the support tube is fixed to the first portion by a mechanical crimp and/or an adhesive (e.g. an ultra-violet adhesive). Additionally or alternatively, the support tube may be laser welded to the first portion.

The flexible sleeve comprises an internal tube surrounding a second portion of the push rod, the internal tube being free to slide with respect to the push rod. The second portion may be a distal side of the reinforcement element. The second portion may be located partly or completely inside the single cable assembly. Additionally, the second portion may be partly inside (i) the housing, (ii) the outlet, or (iii) both. For example, when the slidable trigger is actuated so as to fully extend the push rod, the internal tube may be located only in the single cable assembly (and flexible sleeve), e.g. not inside the outlet or the housing. Additionally or alternatively, when the slidable trigger is actuated so as to fully retract the push rod, the internal tube may be located inside the single cable assembly and the outlet and, possibly, the housing. The internal tube may be a single lumen tube which may define a single channel for multiple different uses. For example, the single lumen tube may carry the push rod. Also, where the interface joint includes a second inlet for receiving fluid, the single lumen tube may carry a fluid feed conduit for providing a fluid flow path between the instrument and interface joint. Additionally or alternatively, the single lumen tube may have an open portion to provide a fluid flow path between the instrument and interface joint, that is, no separate fluid conduit may be required. As such, the fluid flow path may flood an internal cavity and the push rod may be immersed in the fluid. Accordingly, a function of the single lumen tube may be to provide lubricity for the push rod. However, in another embodiment, the internal tube may be a multi-lumen tube, or a single lumen tube having an extruded separator element which defines a plurality of channels (e.g. two, three or more). For example, a separate lumen/channel may carry one or more of the following: the fluid flow path and the push rod.

The interface joint may include a slide limiting mechanism coupled to the push rod and configured to limit a maximum slide distance of the internal tube over the push rod. In this way, movement of the internal tube is limited so as to avoid the tube becoming damaged or causing damage to other components. However, since the slide limiting mechanism permits a certain amount of movement of the internal tube, damage (e.g. due to friction) to the internal tube is reduced because the internal tube can move (in a limited manner) with respect to the push rod. The slide limiting mechanism may include a first stopper element (or structure) fixed to an outer surface of the push rod at a distal side of the internal tube, the first stopper element being configured (e.g. sized and/or shaped) to prevent the internal tube sliding past the first stopper element. Additionally, the slide limiting mechanism may include a second stopper element (or structure) fixed to the outer surface of the push rod at a proximal side of the internal tube, the second stopper element being configured (e.g. sized and/or shaped) to prevent the internal tube sliding past the second stopper element. As such, the first and second stopper elements limit the sliding motion of the internal tube. For example, the first and second stopper elements may be spaced apart on the push rod such that a maximum slide distance of the internal tube over the push rod is limited to 4 mm to 10 mm, and preferably 5 mm. The second stopper element may be spaced from a distal end of the push rod, for example, by 3 mm to 7 mm, and preferably 5 mm. The first stopper element may comprise a blob, drop, bead, or ball of adhesive (e.g. UV adhesive). The first and second stopper elements may encircle all of, or only part of, the circumference of the push rod. The second stopper element may be provided by the support tube (e.g. a distal end of the support tube).

The housing may be made of electrically insulating material. The housing may provide a double isolation barrier for the operator, i.e. the housing may comprise an outer casing (first level of isolation) that encapsulates a branched passageway (second level of isolation) within which the various inputs are integrated into the single cable assembly. The branched passageway may provide a watertight volume which defines a fluid flow path between the second inlet (when present) and the outlet, and which has a first port adjacent to the first inlet for admitting the coaxial cable. In this embodiment, the outer casing may guide the UV encapsulation.

In use, the interface joint may be the location at which fluid for treatment at the instrument is introduced. The operator of the interface joint may control the introduction of fluid, e.g. via a syringe or other fluid introducing mechanism attached to the second inlet (when present). The interface joint may also include a fluid delivery deployment mechanism that acts to instruct or control fluid delivery at the electrosurgical instrument. For example, as mentioned above, the interface joint includes a slidable trigger on the housing, the slidable trigger being attached to a push rod that extends out of the housing through the outlet. The push rod may extend through the flexible shaft to the electrosurgical instrument, where it can control the fluid delivery structure. For example, the electrosurgical instrument may include a retractable needle that is switchable into and out of fluid communication with the fluid flow path in the flexible shaft by sliding the push rod back and forth.

In this arrangement, the branched passageway may include a second port adjacent the slidable trigger for admitting the push rod.

Both the first port and the second port may comprise a sealing bung which defines a watertight passage for the coaxial cable and the push rod respectively. The sealing bung may be formed from a resiliently deformable material, e.g. silicone rubber, whereby the coaxial cable and push rod are encapsulated in the material as they pass through it. Sealing the first and second ports in this way means that the only route for fluid out of the interface joint is through the outlet along the fluid flow path in the flexible sleeve.

The branched passageway may have any suitable configuration. In one embodiment, it is formed from a pair of Y-shaped conduits, which are connected to each over to define a first length in line with the outlet, a second length extending from a side of the first length at an oblique angle to the first length, and a third length extending from a side of the second length. One or both of the Y-shaped conduits may be made from polycarbonate or acrylonitrile butadiene styrene (ABS). The first length may have the push rod extending through it and may terminate at is proximal end in a sealing bung. The second length may have the coaxial cable running through it and may terminate at its proximal end in a sealing bung. The third length may terminate in the second port for receiving the fluid. In this arrangement, the housing may have a pistol-like shape. However, in another embodiment, the branched passageway may have a more compact configuration, in which the different lengths of the passageway run substantially parallel to each other. In this arrangement, the housing may be an elongate capsule sized to fit in an operator's hand.

Where the housing has a pistol-like shape, this shape may have an upper barrel portion and a lower adjoining portion which extends away from a proximal end of the upper barrel portion. For example, the upper barrel portion has a length of between 115 mm and 125 mm, and preferably 120 mm—measured from the distal end of the housing (i.e. the proximal end of the outlet) to the proximal end of the upper barrel portion. Also, the lower adjoining portion has a length of between 100 mm and 110 mm, and preferably 105 mm—measured from the distal end of the housing (i.e. the proximal end of the outlet) to the proximal end of the lower adjoining portion.

Also, the housing (e.g. the upper barrel portion) may include a slot in an outer surface thereof, and the slidable trigger is slidably fixed to the housing (e.g. the upper barrel portion) so as to be slidable within the slot, the slidable trigger having an integral button portion outside the housing, and an integral elongate portion inside the housing, the button portion being smaller (i.e. shorter) in length than the elongate portion. In an embodiment, the slot is positioned towards the proximal end of the upper barrel portion, and the button portion is positioned towards a proximal end of the elongate portion. In this way, the button can be located towards a proximal end of the upper barrel portion such that the slidable trigger is more easily accessible to a user and, thereby more controllable by the user. For example, the slot has a length of between 54 mm to 58 mm, and preferably 56.2 mm, and a width of between 1.0 mm and 1.6 mm, and preferably 1.3 mm. In another embodiment, the slot has a length of between 25 mm and 31 mm, and preferably 28 mm, and a width of between 1.1 mm and 1.8 mm, and preferably 1.4 mm. Positioning the slot and button portion towards the proximal end makes control easier since the button portion is more easily accessible to the user, i.e. the user does not need to stretch their hands as much to move the button portion along the full length of the slot. Also, in this configuration, it is possible to maximise the slide distance of the button to maximise the distance the pull rod can be moved. In turn, this extra slide distance can enable the slidable trigger to compensate for differences between straight and curved positions of the push rod, and can provide additional force to overcome friction when the needle ferrule is in a tight configuration.

The interface joint may be particularly suitable for gathering a plurality of inputs into a single cable assembly before it is inserted through the instrument channel of an endoscope. To achieve this, the cable assembly may have an outer diameter of 9 mm or less, e.g. 2.8 mm or less for a flexible video colonoscope.

In order to facilitate manipulation of the instrument at the distal end of the instrument channel of the endoscope, the flexible sleeve may be provided with longitudinal braids therein to assist in the transfer of torque, i.e. to transfer a twisting motion at the proximal end of the cable assembly to the distal end of the cable assembly, where it can cause bi-rotational rotation of the instrument because the instrument is attached to the cable assembly. The flexible sleeve may comprise an inner tube and an outer tube, which are bonded or otherwise attached together with a tube of metallised braiding in between. The inner tube or the outer tube may be made from a polymer, such as, a thermoplastic elastomer, such as, polyether block amide or PEBA (e.g. PEBAX™). Also, the braided tube may include two or more (e.g. three) radially spaced layers of wrap mounted braided wire. Each layer or each wrap may consist of multiple wires, for example, six wires. In an embodiment, each wire may have a substantially flat cross-section. Further, adjacent layers of the braided wire may have opposite wrapping directions. The pitch of the braiding may be variable along the length of the cable assembly. For example, it may be useful to have a wider pitch in a region e.g. a distal portion of the cable, where flexibility is important. In order to prevent the metallised braiding from interfering with the RF field or microwave field at the instrument, a distal portion of the flexible sleeve may be provided in which the braided is absent. The distal portion may be manufactured separately and attached (e.g. bonded or welded) to the braided portion. The distal portion may be referred to as a "soft tip" and may, in use, facilitate device manipulation by forming a more flexible portion which can move with an endoscope. The distal portion may also function to bond the instrument tip to the flexible sleeve.

The housing may further comprise a strain relief element mounted in the outlet and surrounding the flexible sleeve. The function of the strain relief element is to limit the movement of the sleeve in this location to prevent overflexing that may damage the internal components.

A distal end of the push rod may be connected to a proximal end of a needle ferrule, which has a needle clamped to its distal end. The ferrule may be hollow, with one or more openings in its outer wall that cause its interior to be in fluid communication with the fluid flow path through the flexible sleeve. The distal end of the ferrule may be open such that the needle mounted in the distal end is in fluid communication with the fluid flow path. The proximal end of the ferrule may be sealed by the push rod.

The interface joint may include a coaxial cable attached to the first inlet via an interface connection, wherein the interface connection is arrange to permit relative rotation of the interface joint relative to the coaxial cable.

Herein, radiofrequency (RF) may mean a stable fixed frequency in the range 10 kHz to 300 MHz and microwave frequency may mean a stable fixed frequency in the range 300 MHz to 100 GHz. The RF energy should have a frequency high enough to prevent the energy from causing nerve stimulation and low enough to prevent the energy from causing tissue blanching or unnecessary thermal margin or damage to the tissue structure. Preferred spot frequencies for the RF energy include any one or more of: 100 kHz, 250 kHz, 400 kHz, 500 kHz, 1 MHz, 5 MHz. Preferred spot frequencies for the microwave energy include 915 MHz, 2.45 GHz, 5.8 GHz, 14.5 GHz, 24 GHz.

BRIEF DESCRIPTION OF THE DRAWINGS

Examples embodying the invention as discussed in detail below with reference to the accompanying drawings, in which:

FIG. 5A is a perspective view of a stopper used in the interface joint shown in FIG. 2;

FIG. 5B is a cross-sectional view through the stopper shown in FIG. 5A;

DETAILED DESCRIPTION; FURTHER OPTIONS AND PREFERENCES

Various aspects of the present inventions are presented below in the context of an electrosurgery system that provides an electrosurgical invasive instrument for use in endoscopic procedures for the removal of polyps and malignant growths through the controlled delivery of both microwave and RF energy. However, it is to be understood that the aspects of the invention presented herein need not be limited to this particular application. They may be equally applicable in embodiments where only RF energy is required, or where only RF energy and fluid delivery is required.

Figure 1:
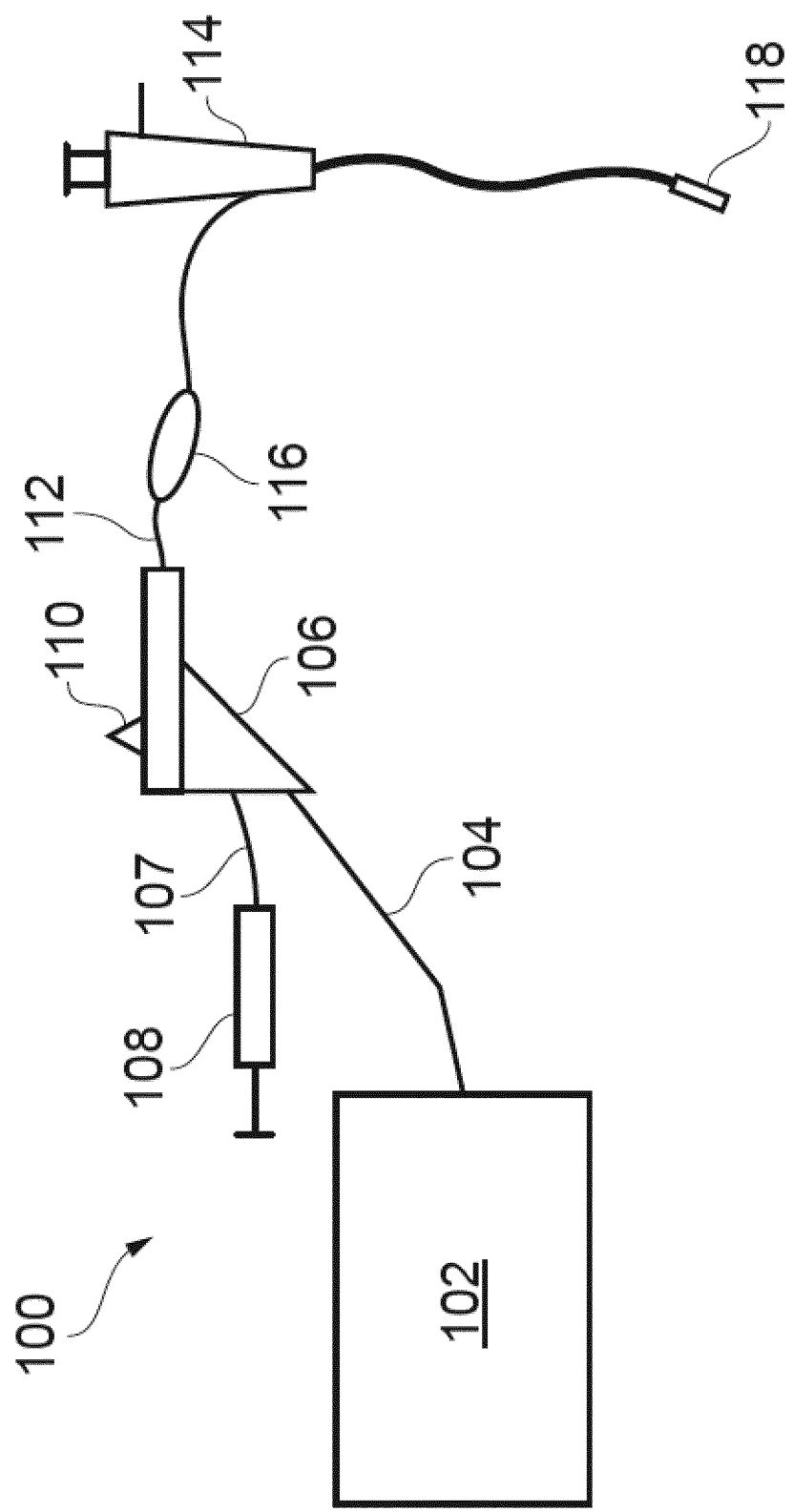
FIG. 1 is a schematic view of a complete electrosurgery system in which the present invention is applied.

FIG. 1 is a schematic diagram of a complete electrosurgery system 100 that is capable of selectively supplying to the distal end of an invasive electrosurgical instrument any or all of RF energy, microwave energy and fluid, e.g. saline or hyaluronic acid. The system 100 comprises a generator 102 for controllable supplying electromagnetic (EM) energy. In the present embodiment, the EM energy includes RF EM energy and/or microwave frequency EM energy. A suitable generator for this purpose is described in WO 2012/076844, which is incorporated herein by reference.

The generator 102 is connected to an interface joint 106 by an interface cable 104. The interface joint 106 is also connected to receive a fluid supply 107 from a fluid delivery device 108, such as a syringe. The interface joint 106 houses a needle movement mechanism that is operable by sliding a trigger 110. The function of the interface joint 106 is to combine the inputs from the generator 102, fluid delivery device 108 and needle movement mechanism into a single flexible shaft 112, which extends from the distal end of the interface joint 106. It is to be understood that the shaft 112 may form part of the interface joint 106. The internal configuration of the interface joint 106 is discussed in more detail below.

The flexible shaft 112 is insertable through the entire length of an instrument (working) channel of a surgical scoping device 114. A torque transfer unit 116 is mounted on a proximal length of the shaft 112 between the interface joint 106 and surgical scoping device 114. The torque transfer unit 116 engages the shaft to permit it to be rotated within the instrument channel of the surgical scoping device 114.

The flexible shaft 112 has an electrosurgical instrument tip 118 that is shaped to pass through the instrument channel of the surgical scoping device 114 and protrude (e.g. inside the patient) at the distal end of the endoscope's tube. The instrument tip includes an active tip for delivering RF EM energy and/or microwave EM energy into biological tissue and a retractable hypodermic needle for delivering fluid. These combined technologies provide a unique solution for cutting and destroying unwanted tissue and the ability to seal blood vessels around the targeted area. Through use of the retractable hypodermic needle, the surgeon is able to inject saline and/or hyaluronic acid with added marker dye between tissues layers in order to distend and mark the position of a lesion to be treated. The injection of fluid in this manner lifts and separates the tissue layers making it both easier to resect around the lesion and plane through the submucosal layer, reducing the risk of bowel wall perforation and unnecessary thermal damage to the muscle layer.

As discussed in more detail below, the instrument tip 118 further includes a protective hull positioned under the active tip to assist a tissue planing type resection action, again helping to protect against inadvertent perforation and ensure viability of the remaining tissue, which in turn facilitates more rapid healing and post operation recovery.

The structure of the instrument tip discussed below may be particularly designed for use with a conventional steerable flexible endoscope having a working channel with an internal diameters of at least 3.3 mm and a channel length of between 60 cm and 170 cm. As such the majority of the comparatively small diameter (less than 3 mm) instrument is housed within the lumen of a much larger and predominantly polymer insulating device, i.e. the flexible endoscope channel, which typically has an outer diameter of 11 mm to 13 mm. In practice, only 15 mm to 25 mm of the distal assembly protrudes from the distal end of the endoscope channel, in order not to block the field of view or adversely affect camera focussing. The protruding part of the distal assembly is the only portion of the instrument that ever makes direct contact with the patient.

At the proximal end of the endoscope working channel, which is typically held 50 cm to 80 cm from the patient, the flexible shaft 112 emerges from the working channel port and extends a further 30 cm to 100 cm to the interface joint 106. In use, the interface joint 106 is typically held by a gloved assistant throughout the procedure. The interface joint 106 is designed and manufactured from polymer materials in such a way as to provide primary and secondary electrical insulation with extended creepage and clearance distances. The interface cable 104 is connected to the generator 102 using a QMA-type coaxial interface, which is designed to allow continuous clockwise or counter clockwise rotation. This permits the interface joint 106 to rotate with the torque transfer unit 116 under the control of the user. The assistant supports the interface joint 106 throughout the procedure in order to assist the user with sympathetic instrument rotation, needle control and fluid injection.

Figure 2:
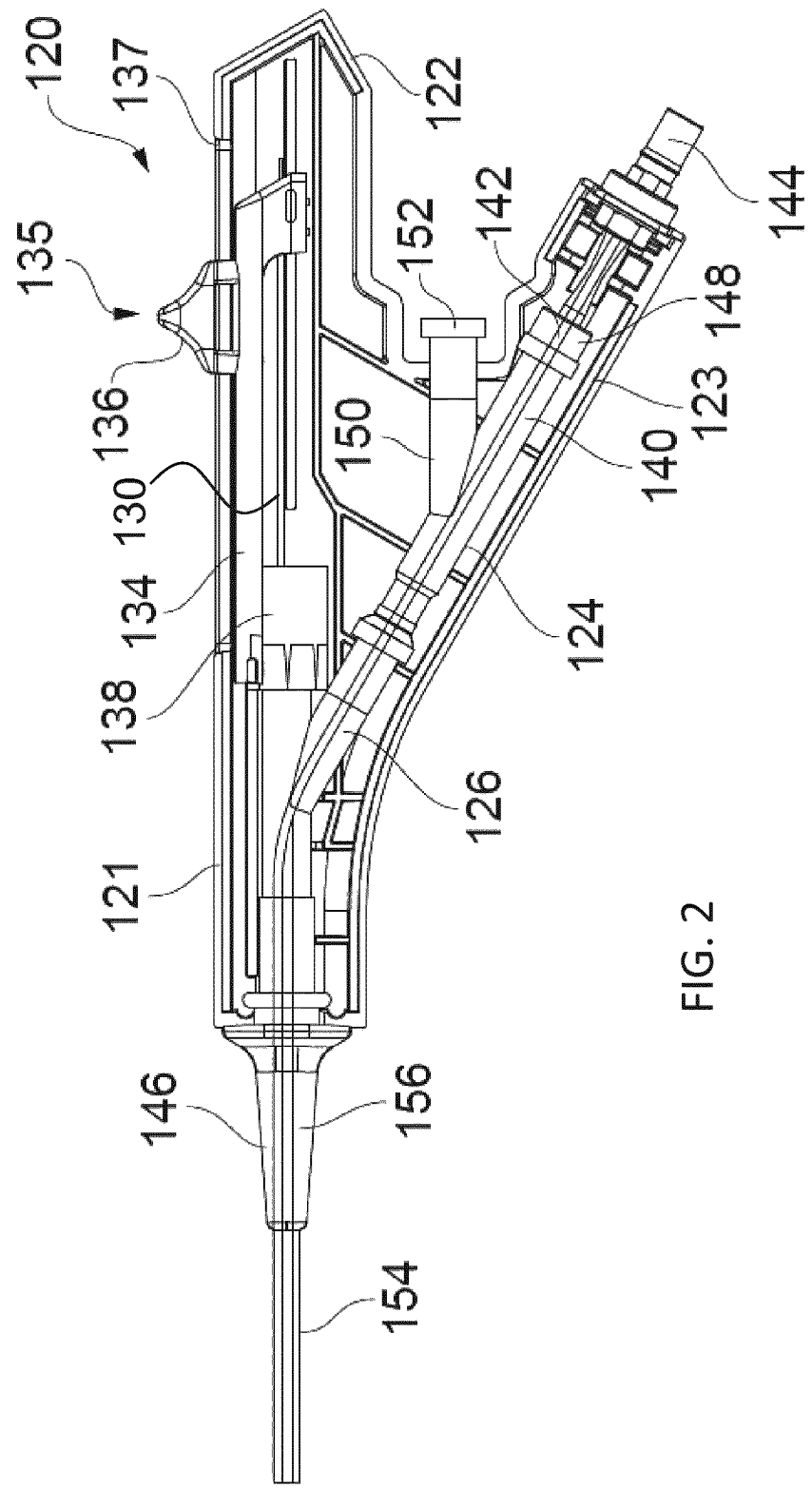
FIG. 2 is a cross-sectional view of an interface joint that is an embodiment of the invention.
Figure 3:
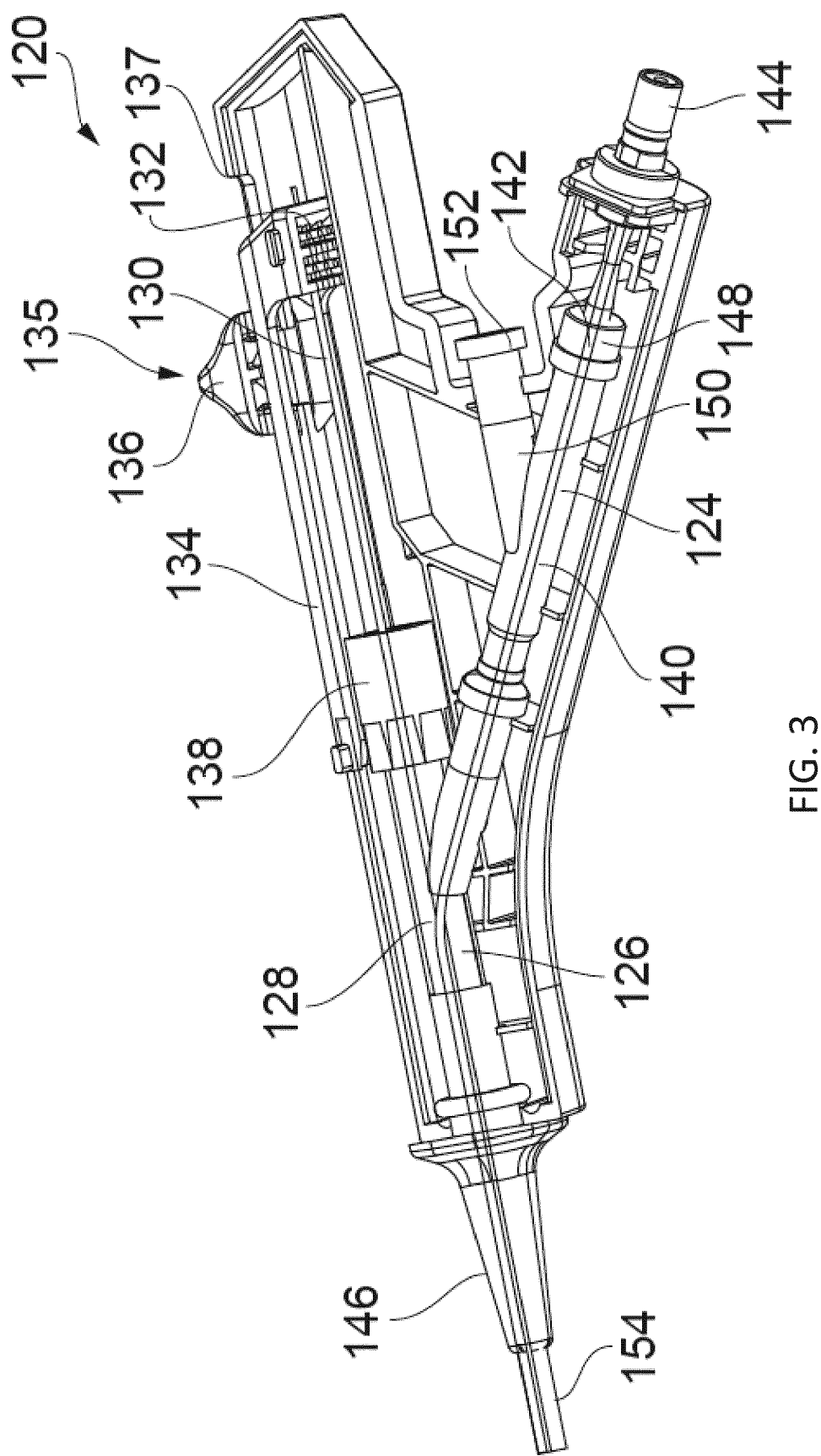
FIG. 3 is a cut away perspective view of the interface joint shown in FIG. 2.

FIGS. 2 and 3 show the structure of an interface joint 120 that is an embodiment of the invention. The interface joint comprises a housing or hard plastic shell 122, which encases several internal components. In FIGS. 2 and 3 one half of the shell 122 is removed to show the inside of the joint. The shell 122 is in the shape of a pistol, i.e. it has an upper barrel portion 121 and a lower adjoining portion 123 which extends away from a proximal end of the upper barrel portion at an oblique angle. The upper barrel portion 121 contains the needle movement mechanism, while the lower adjoining portion 123 contains the connections for the fluid and energy feeds. In an embodiment, the upper barrel portion has a length of about 120 mm, and the lower adjoining portion has a length of about 105 mm.

The core of the interface joint 120 is a pair of Y-shaped conduits 124, 126 which are mated together to define a branched passageway. The Y-shaped conduits may be made from polycarbonate or other suitable hard plastic (e.g. ABS), and are shown in more detail in FIGS. 4A and 4B.

Figures 4A, 4B:
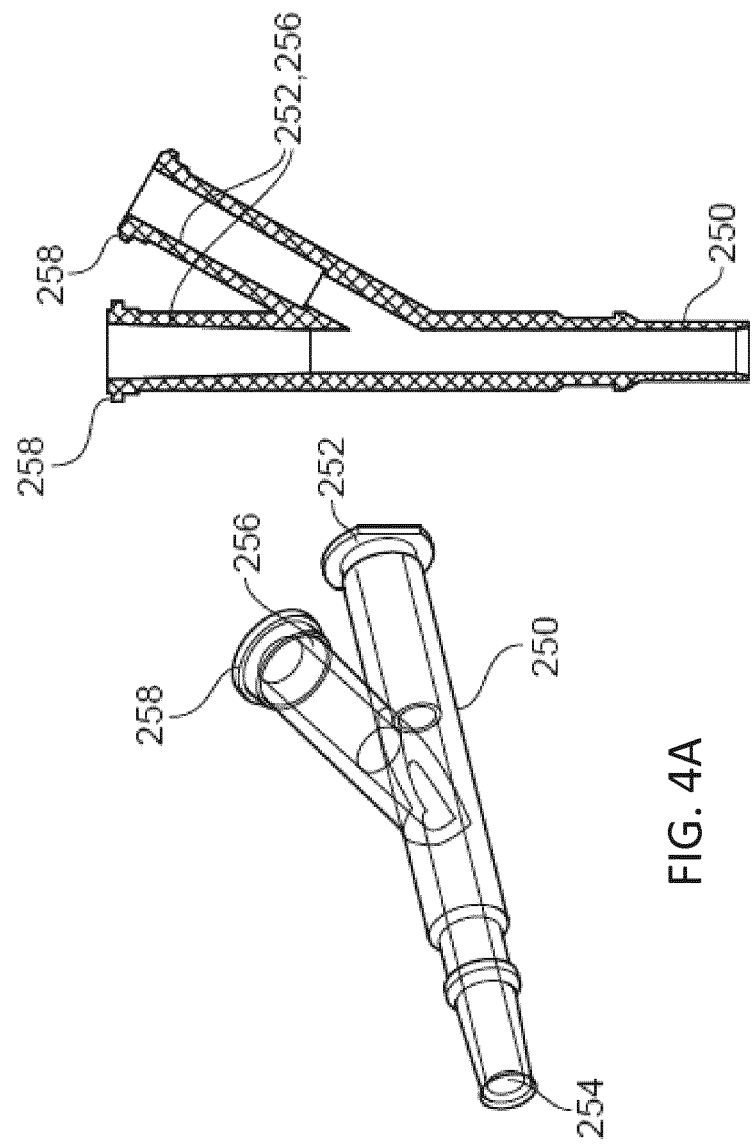
FIG. 4A is a perspective view of a Y-shaped connector used in the interface joint shown in FIG. 2.
FIG. 4B is a cross-sectional view through the Y-shaped connector shown in FIG. 4A.

FIGS. 4A and 4B show the Y-shaped conduits 250 from which the branched passageway is formed. Each Y-shaped conduit has a main linear channel between a first inlet 252 and an outlet 254, and a second channel at an oblique angle to the main linear channel, the second channel having a second inlet 256 and joining the main linear channel about halfway along its length. Each of the first inlet 252 and the second inlet 256 has a rotary luer lock fitting 258.

Returning to FIGS. 2 and 3, a first length 128 of the branched passageway is mounted in and lies along the upper barrel portion 121 of the shell 122. The first length 128 receives at its proximal end a push rod 130 for controlling deployment of the retractable needle. The push rod 130 has a crooked proximal end 132, which is mounted, e.g. heat staked, in a slidable trigger 135. The slidable trigger 135 includes an integral elongate portion 134 which is positioned inside the shell 122 and an integral button portion 136 which is positioned outside the shell 122. The push rod 130 may be fixed to a proximal end of the elongate portion 134. The button portion may be smaller in length than the elongate portion 134 such that a majority of the structure of the slidable trigger 135 is located within the shell 122.

Considering the slidable trigger 135 in more detail, the upper barrel portion 121 comprises a slot 137 in an outer surface thereof, and the slidable trigger 135 is slidably fixed to the upper barrel portion 121 so as to be slidable within the slot 137. For example, the slidable trigger 135 may be formed with side grooves which each receive a different side edge of the slot 137 such that the slidable trigger 135 can slide along the sides of the slot 137. In an embodiment, the slot has a length of about 56.2 mm, and a width of about 1.3 mm. The button portion 136 protrudes from the shell 122 of the interface joint 120 so that a user's thumb can move the button portion 136 to and fro, which causes a needle to slide in and out of the distal assembly via sliding movement of the push rod 130 and a needle ferrule, as will be described in more detail below. In an embodiment, the slot 137 is positioned towards the proximal end of the upper barrel portion 121, and the button portion 136 is positioned towards a proximal end of the elongate portion 134. Positioning the slot 137 and button portion 136 towards the proximal end makes control easier because the button portion 136 is more easily accessible to the user in use. That is, the user will likely hold the interface joint towards its proximal end since this configuration is more comfortable for human hands than, for example, holding the distal end of the shell 122. Also, by holding the proximal end of the shell 122, it is possible to maximise the slide distance of the button portion 136 to maximise the distance the pull rod 130 can be moved inwards and outwards (i.e. its maximum slide travel). Extra slide distance can enable the slidable trigger 135 to compensate for differences between straight and curved positions of the push rod 130, and can provide additional force to overcome friction when the needle ferrule is in a tight configuration. Additionally, extra slide distance can advantageously allow needle extension in torturous endoscope positions. Whilst such advantages may be available by making the interface joint generally larger, this will increase device bulkiness and, therefore, would make it less easy to handle and control. Hence, positioning the slot and button portion as described above permits the same advantages without having to increase the overall bulkiness of the interface joint.

The proximal end of the first length 128 is sealed by a silicone bung 138, which is shown in more detail in FIGS. 5A and 5B. FIGS. 5A and 5B are respectively perspective and cross-sectional views of the bung 138 that seals the proximal end of the first length of the branched passageway. The bung comprises a rotary luer lock fitting 246 and an integral sealing diaphragm 248, e.g. made of resiliently deformable rubber.

Returning to FIGS. 2 and 3, a second length 140 of the branched passageway is mounted in and lies along the lower adjoining portion 123, i.e. at an oblique angle to the first length 128. The second length 140 conveys a coaxial cable 142 from a proximal QMA-type connector 144 to the proximal end of the first length 128, where it meets the push rod 130 and exits the interface joint 120 through the distal outlet 146. The QMA-type connector 144 is connected to the interface cable from the generator. The coaxial cable 142 may be a Sucoform 047 coaxial cable coated in a 30 μm layer of Parylene C. The coaxial cable 142 may pass through a silicone sealing plug 148 at the proximal end of the second length 140.

A third length 150 of the branched passageway leads off from the second length 140 to provide an outward facing fluid receiving port 152. The fluid receiving port 152 may be a threaded luer lock fitting, for sealing engagement with a suitable syringe or the like. The sealing plug 148 and the bung 138 cause the branched passageway to be sealed in a watertight manner, whereby fluid introduced at the fluid receiving port 152 can only exit the interface joint 120 through the distal outlet 146.

The distal outlet 146 of the interface joint receives therethrough a proximal portion of the flexible shaft 154 that is introduced into the instrument channel of the endoscope. The flexible shaft conveys the fluid, push rod 130 and coaxial cable 142 as discussed below. A proximal end of the flexible shaft 154 is directly bonded into the branched passageway so that there is some overlap along the upper barrel portion 121. This bonded junction is masked by a covering 156 (e.g. of silicone rubber) which fits like a stretched glove and is bonded in place. The covering 156 operates as a strain relief element, and also doubles as an end of shaft flexible bend restrictor.

The primary user of the interface joint 120 may be the endoscopist's assistant. In use, the operator typically offers the distal tip of the instrument to the endoscopist for insertion down the working channel of the flexible endoscope, makes the electrical connection between interface joint 120 and the interface cable (which is connected to the generator) and then supports the interface joint 120 itself throughout the procedure. During the procedure the operator can inject the distension/marker fluids as required via 5 to 20 ml syringes attached to the fluid receiving port 152 and operate the needle slider 134 as instructed by the endoscopist.

The flexible shaft 154 comprises an outer cannula tube that contains the coaxial cable 142, push rod 130 and fluid. The specific internal structure of the flexible shaft is discussed below with reference to FIG. 8. The distal assembly is fixed to the outer cannula tube in a manner that means any rotation applied to the tube is passed to the distal assembly. Accordingly, to permit rotatable manipulation of the distal assembly, a torque transfer unit (e.g. 116 of FIG. 1) is mounted on the flexible shaft in order to facilitate rotation thereof.

The slidable trigger 135 may have free reciprocal movement as in the embodiment shown in FIGS. 2 and 3. However, in some other embodiments, a latch mechanism (not shown) may be provided to lock and park the slidable trigger 135 in the fully retracted needle position. Alternatively the slidable trigger 135 may have a spring-loaded action which biases the mechanism into the retracted state. With the sprung loaded option the user (assistant) would need to hold the slider forward against the spring whilst injecting the fluid.

Figure 6:
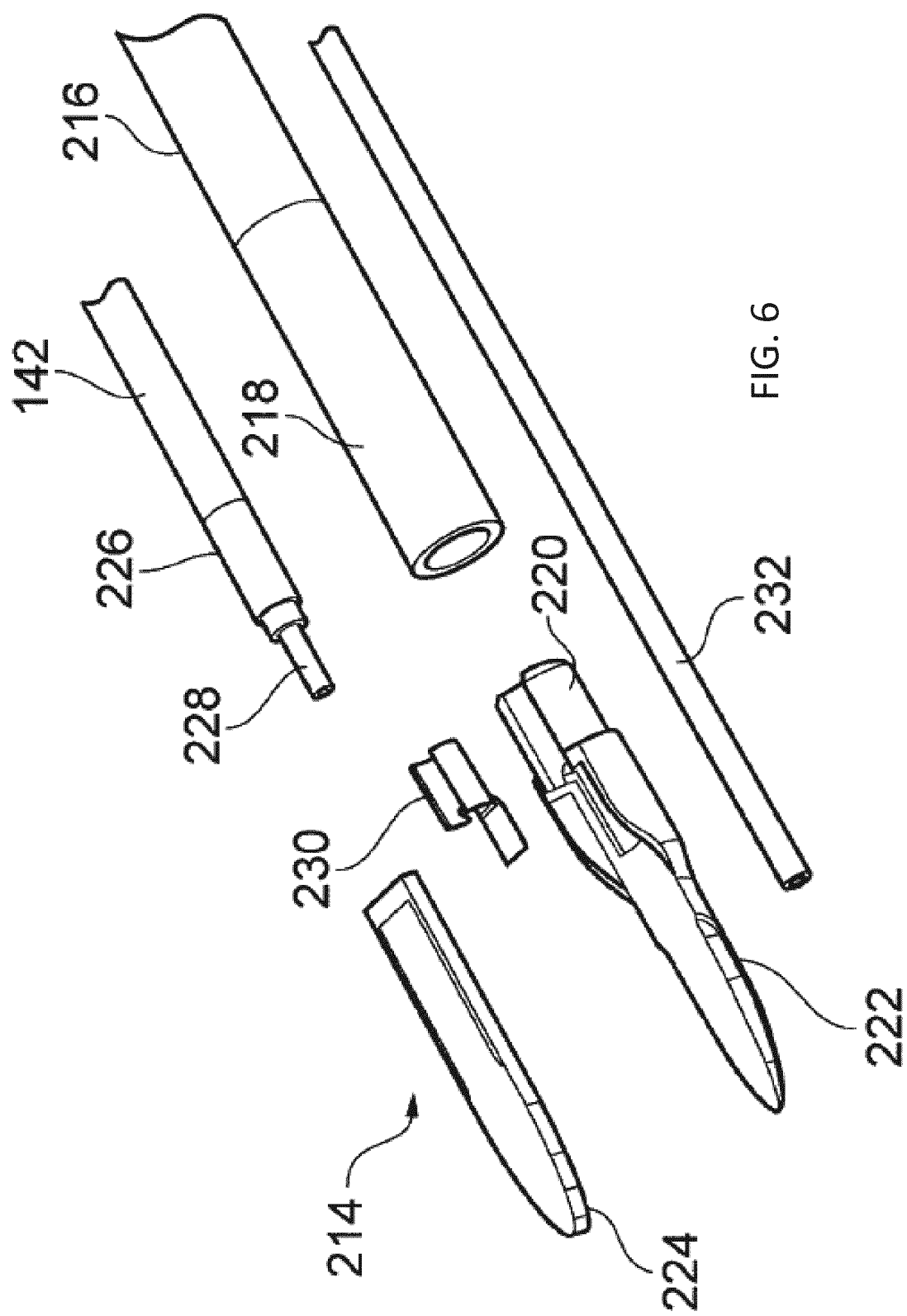
FIG. 6 is an exploded view of a distal end assembly for an electro-surgery device.
Figure 7:
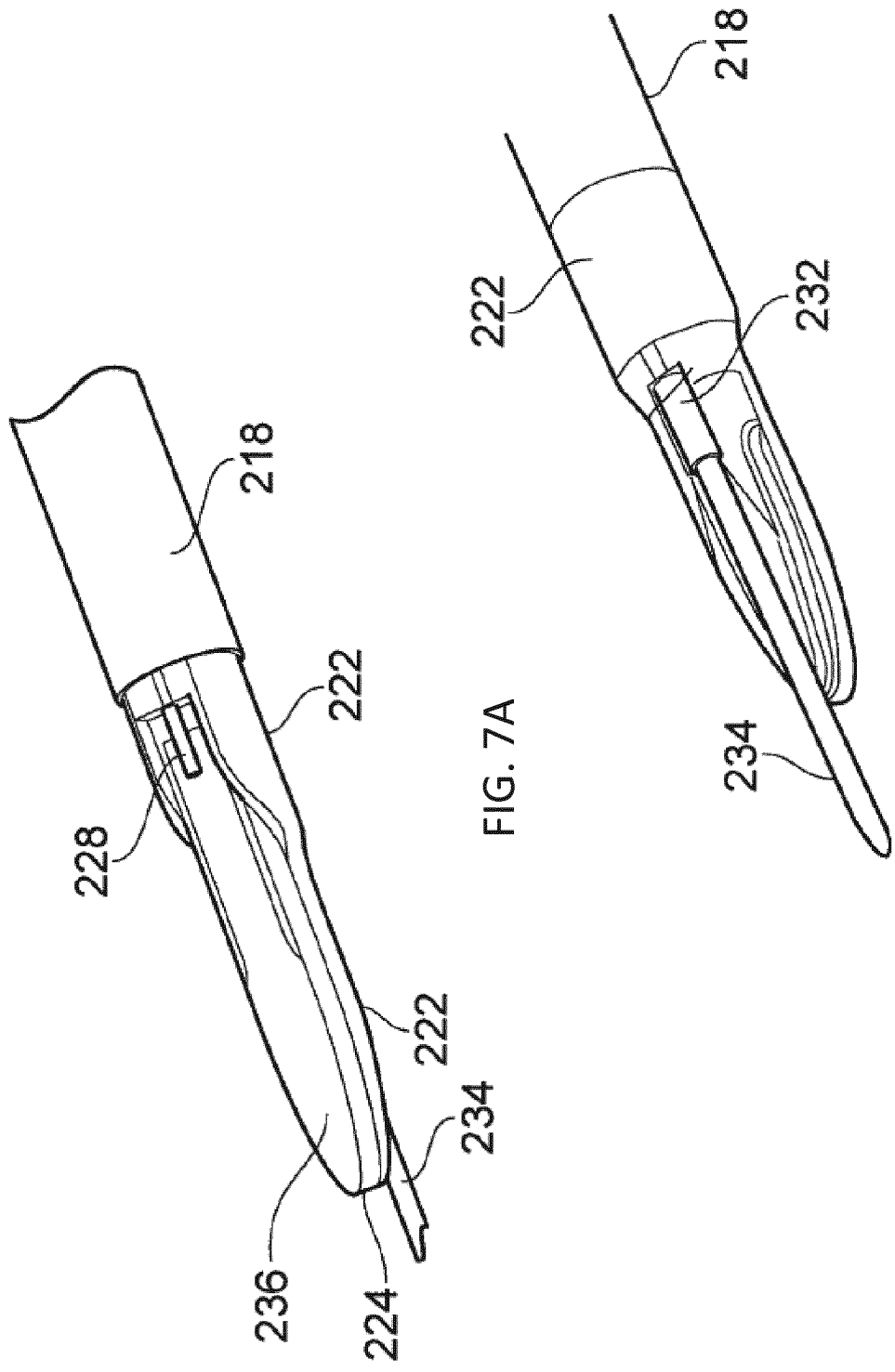
FIG. 7A is a top perspective view of the distal end assembly of FIG. 6 in an assembled state.
FIG. 7B is a bottom perspective view of the distal end assembly of FIG. 6 in an assembled state.

FIGS. 6, 7A and 7B show details of an exemplary distal assembly 214 comprising an active tip that can be used with an interface joint in accordance with an embodiment. FIG. 6 shows an exploded view of the components that form the distal assembly 214. The distal assembly 214 is mounted at the distal end of an outer cannula tube 216 of the flexible shaft 154 that is discussed above. In order to provide a torque transfer function, the majority of the outer cannula tube 216 is formed of a braided tube, e.g. comprising a braided wire (e.g. stainless steel) wrap mounted between a radially inner polymer layer and a radially outer polymer layer. The inner polymer layer or the outer polymer layer may be made from a thermoplastic elastomer, such as, polyether block amide or PEBA (e.g. PEBAX™). Also, the braided tube may comprise two or more (e.g. three) radially spaced layers of the wrap mounted braided wire. Each wrap or each layer may consist of multiple wires, for example, six wires. Also, the wires may have a flat cross-section. Further, adjacent layers of the braided wire may have opposite wrapping directions. For example, the braided tube may have five layers, wherein a radially innermost layer is wrapped with an anticlockwise wrapping direction, then each subsequent layer may be wrapped with the following wrapping directions: clockwise, anticlockwise, clockwise, and anticlockwise. However, to avoid the braid material from interfering with the delivery of RF and/or microwave frequency EM energy to the distal assembly, a distal portion 218 of the outer cannula tube 216 is made purely of the polymer layers, i.e. without an internal braid.

The distal portion 218 of the outer cannula layer 216 fits on to a corresponding proximal part 220 of a protective hull 222. The protective hull 222 is formed from polyether ether ketone (PEEK) or any other suitable engineering plastic, and is shaped to perform a number of functions, i.e.
mount the distal assembly on the flexible shaft,
provide a protective undersurface for the active tip,
provide a protective housing for the needle, and
locate the active tip relative to the coaxial cable.

The distal assembly 214 includes an active tip 224, which is a planar piece of dielectric material (e.g. alumina) having conductive layers (e.g. of gold) on its upper and lower surfaces. The distal end of the active tip 224 is curved. The conductive layers are electrically connected to the inner and outer conductors of the coaxial cable 142 that is conveyed by the flexible shaft 216. At the distal end of the coaxial cable 142, its outer sheath is removed to expose a length of the outer conductor 226. The inner conductor 228 of the coaxial cable extends beyond the distal end of the outer conductor 226. The coaxial cable 142 and the active tip 224 are mounted relative to one another so that the protruding part of the inner conductor 228 lies on a first conductive layer of the active tip, while the outer conductor 226 is brought into electrical connection with a second conductive layer by a conductive adaptor element 230. The first conductive layer is isolated from the outer conductor 226 and the second conductive layer is isolated from the inner conductor 228.

When assembled, as shown in FIGS. 7A and 7B, the active tip 224 and coaxial cable 142 are bonded to each other and to the hull 222 by the application of epoxy adhesive over the portion of the inner conductor 228 that projects from the outer conductor. This epoxy adhesive also serves to form an end plug for the outer cannula tube, i.e. a fluid tight seal that means the only exit for fluid introduced at the interface joint is through the needle.

The hull 222 includes a recess for retaining a needle guide tube 232, e.g. made of polyimide. In use the distal assembly 214 makes an intimate contact with the patient. The needle 234 can be extended beyond the distal end of the active tip 224 and retracted to a position back inside the guide tube 232 via control of the slider mechanism on the interface joint. In its extended position, the needle is used by the endoscopist to inject fluid for the purpose of locally distending and marking tissue. The conductive layers on the active tip 224 form bi-polar electrodes for delivering RF and/or microwave frequency energy.

The needle guide 232 extends back inside and proximal to the distal assembly to provide extended creepage clearance to ensure RF/microwave activation only occurs across the distal tip region of the active tip 224.

Similarly it can be seen that the conductive layer 236 is recessed back in behind the distal tip region of the active tip 224. This is done on both upper and lower faces to increase the tracking/creepage distance at the proximal end of the active tip, further ensuring that RF/microwave energy is focused towards the distal end and intentional active element of the tip.

Figure 8:
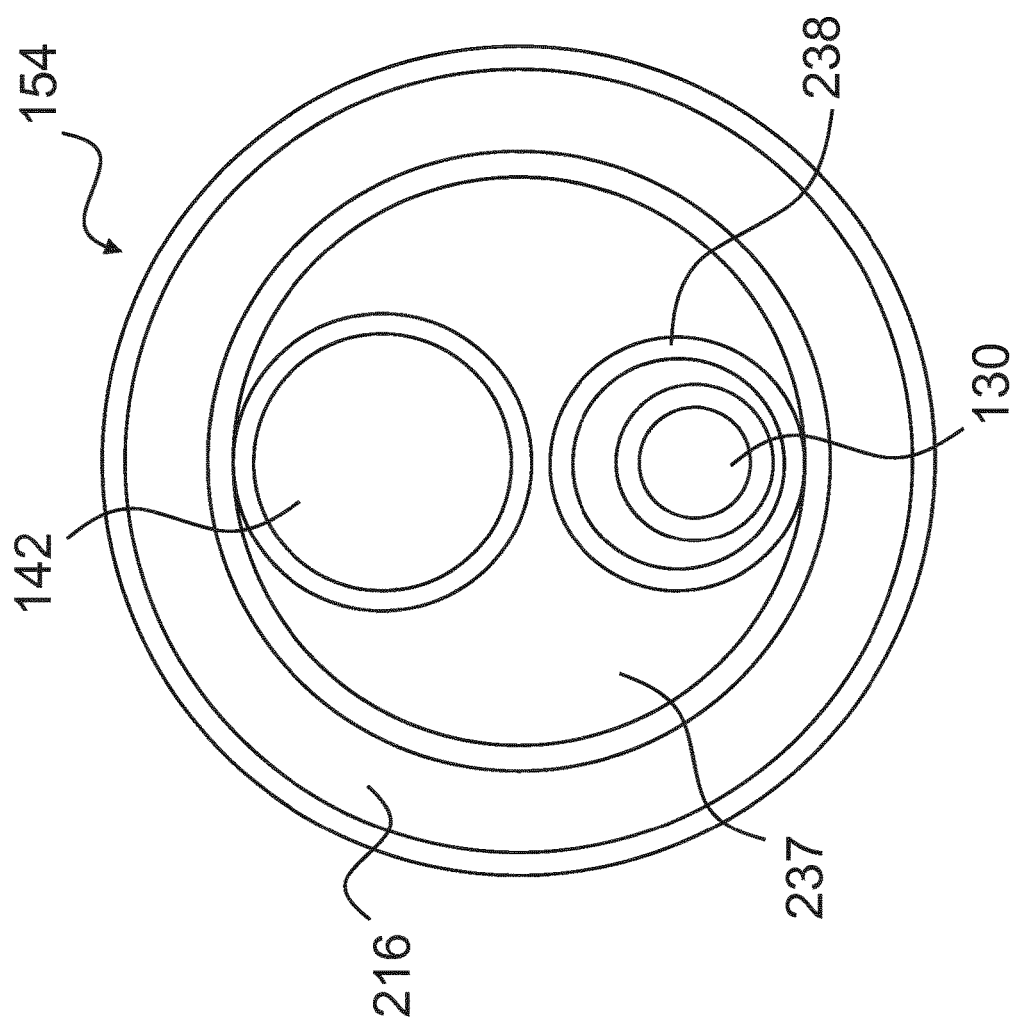
FIG. 8 is a cross-sectional view of a cable assembly in accordance with an embodiment.
Figure 9:
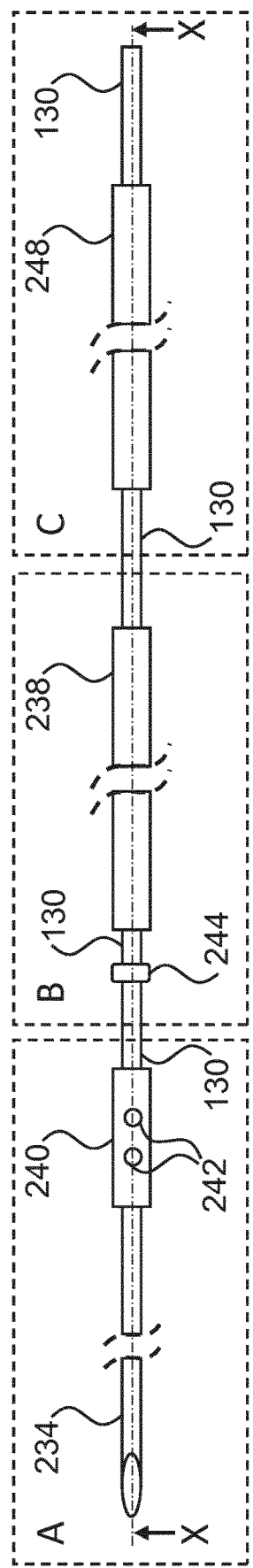
FIG. 9 is schematic view of certain internal parts of the interface joint of FIG. 2.

FIG. 8 shows a typical cross section of the flexible shaft 154, which may form part of the interface joint in accordance with an embodiment. As stated above, the flexible shaft may connect the distal assembly 214 to the other parts of the interface joint. The flexible shaft 154 may run for 2.3 m or 1.75 m, e.g. the entire length of the instrument connecting the interface joint to the distal assembly. During use the majority of this shaft length sits within the working channel of the flexible endoscope. The flexible shaft 154 comprises the outer cannula tube 216 (i.e. the braided tube discussed above), which forms a fluid tight cannula 237 and electrical barrier between user/patient, and the coaxial Sucoform cable 142 which itself is further insulated. The outer cannula tube 216 also houses an internal tube 238 which provides a low friction pathway for the push rod 130 and stability/support to the construction whilst ensuring a fluid pathway is maintained along the full length of the cannula at all times. In an embodiment, the internal tube 238 is a single lumen PTFE tube. In the embodiment of FIG. 8, the push rod is immersed in fluid contained within the internal tube 238.

Through the length of the flexible shaft 154, the coaxial cable 142 (e.g. Sucoform 047 cable) forms one lumen of a composite construction with the braided and double insulated outer cannula tube 216 forming the flexible protective instrument shaft. To manage the potential thermal risk posed in use activation controls may be imposed on the use of microwave energy by the generator. For example, in the first application instance activation may be limited to 20 s (continuous output), and thereafter the average power incidence on the proximal end of the distal assembly may be limited to 4 W. This control may be imposed independently of the endoscopist, e.g. via the generator software. With this control in place a temperature of 40° C. has been observed after 20 s continuous activation on the polymer surface of the instrument shaft immediately distal of the interface joint. After 20 s the temperature then falls as further continuous microwave activation by the Endoscopist is automatically interrupted by the generator software. Full 20 s activation capacity may be prevented until 240 s (12×20 s) has elapsed.

In practice, it may not be necessary to activate the coagulation function for longer than 10 s due to concerns over perfusion at the tip resulting in potential full wall thickness injury to the bowel wall.

FIGS. 9, 10A, 10B and 10C depict the transition path from the push rod 130 to the needle 234. It is to be understood that, for clarity, FIGS. 9, 10A, 10B and 10C do not show many of the above-described components, such as, the flexible tube 154, the coaxial cable 142, the shell 122, or the outlet 146. Nevertheless, these components are present, they are just not shown in the schematics of FIGS. 9, 10A, 10B and 10C for clarity. It is also to be understood that the proximal end of the push rod 130 is fixed to the slidable trigger 135, as described above with reference to FIGS. 2 and 3.

Figure 10A:
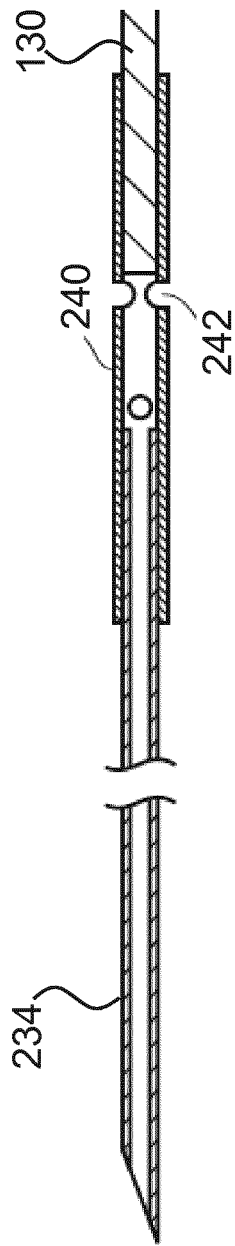
FIGS. 10A, 10B and 10C are enlarged cross-sectional views taken along line X-X in delineated regions A, B and C of FIG. 9, respectively.
Figure 10B:
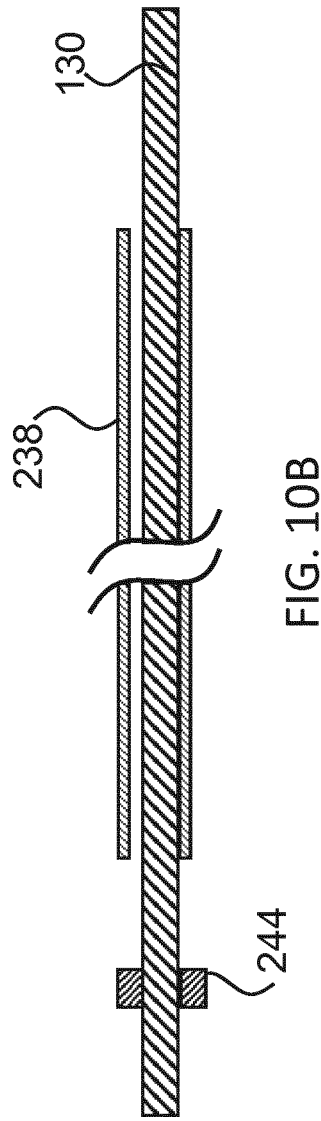
Figure 10C:
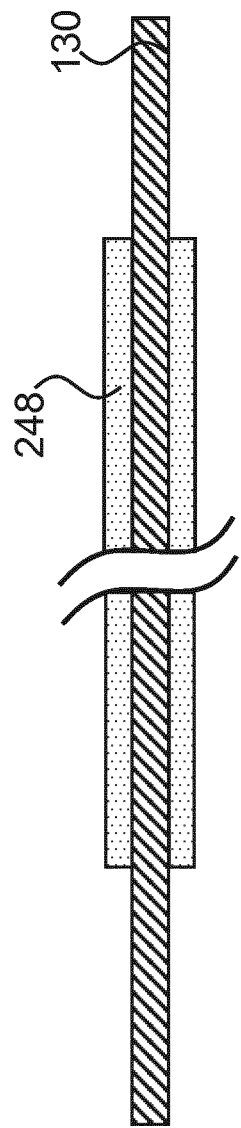

Considering FIGS. 9, 10A, 10B and 10C, a needle ferrule 240 is connected to the push rod 130 at a proximal end thereof and is connected to the needle 234 at a distal end thereof. A set of holes 242 in the outer surface of the needle ferrule 240 permits ingress of fluid from the flexible shaft for delivery out of the needle 234. As shown in FIG. 10A, the distal end of the push rod 130 is fixed to the proximal end of the ferrule 240 (e.g. by welding). A stopper element 244 is fixed to the outer surface of the push rod 130 towards a distal end of the push rod. In an embodiment, the stopper element 244 is spaced from the distal end (and the needle ferrule 240) by about 2 mm to 6 mm. The aforementioned internal tube 238 surrounds a portion of the push rod 130 which is a proximal side of the stopper element 244. A support tube 248 surrounds another portion of the push rod 130 which is a proximal side of the internal tube 238. Further, a portion of the push rod 130 may protrude beyond the proximal end of the support tube 248. Alternatively, though not shown, the proximal ends of push rod 130 and the support tube 248 may terminate at the same point, i.e. neither one may protrude beyond the other.

The support tube 248 provides a reinforcement element which couples to the push rod 130 so as to reinforce a portion of the push rod which is located inside the shell 122. The support tube 248 is located within the shell 122 of the interface joint when the push rod 130 is fully retracted, but the distal end of the support tube 248 may protrude into the outlet 146 and the flexible shaft 154 as the push rod 130 becomes fully extended. The support tube 248 may be manufactured from stainless steel. Also, the support tube 248 may be fixed to the push rod 130 to prevent relative movement between the support tube 248 and the portion of push rod 130 which the support tube 248 surrounds. For example, the support tube 248 may be fixed to the push rod 130 via one or both of a mechanical crimp or an adhesive (e.g. UV adhesive). For instance, a mechanical crimp may be applied first and then subsequently sealed with adhesive. Also, laser welding may be used to join the push rod 130 and the support tube 248.

A function of the reinforcement element is to strengthen a portion of the push rod 130 which is located within a free space or cavity of the shell 122. Since this portion is located in free space, it may be susceptible to bending and flexing which, in turn, may affect the retraction and extension of the needle 234. For example, when a user slides the slidable trigger 135, the sliding force may cause a portion of the push rod 130 inside the shell 122 to bend radially instead of, or in addition to, sliding axially. A result of this bending is that the needle movement at the end may be less than expected or desired considering the amount of sliding applied to the trigger. Since needle operation is associated with delicate surgical procedures, an effect of bending may be a prolonged surgical procedure. Therefore, the introduction of the reinforcement element strengthens the push rod so as to reduce the chance that it will bend. In turn, operation of the interface joint and the wider electrosurgical system is improved.

It is to be understood that in some other embodiments, the reinforcement element may take a form which is different to the support tube 248. For example, in another embodiment, the reinforcement element may be an elongate structure which is parallel with, and fixed to, a portion of the push rod 130 which is located inside the shell 122. The elongate structure may be solid or partially hollow. The elongate structure may have a circular or rectangular cross-section. The elongate structure may be parallel with, but not coaxial with, the push rod 130, and may be fixed to the push rod 130 by one or more mechanical fixtures. This form of reinforcement element operates in the same manner as the previously described support tube, in that the elongate structure provides additional strength to the push rod 130 such that bending of the push rod 130 within the shell 122 is avoided.

Returning to the embodiment of FIGS. 9, 10A, 10B and 10C, the internal tube 238 surrounds a portion of the push rod 130 which is outside of the shell 122 and outlet 146. Also, the internal tube 238 surrounds a portion of the push rod 130 which is a distal side of the support tube 248. In an embodiment, when the push rod 130 is fully extended, the internal tube 238 may be located within the flexible sleeve 154 and outside the outlet 146 and shell 122; however, the proximal end of the internal tube 238 may protrude into the outlet 146 and the shell 122 as the push rod 130 becomes fully retracted. The internal tube 238 can have one or more lumens or channels; however, in the embodiment shown, the internal tube 238 is a single lumen tube. The internal tube 238 may be made from polytetrafluoroethylene (PTFE). The internal tube 238 conveys the push rod 130 and is free to slide with respect to the push rod 130. That is, an inner diameter of the internal tube 238 is larger than an outer diameter of the push rod 130, as seen clearly on FIGS. 8 and 10B. However, the interface joint also includes a slide limiting mechanism which limits the amount by which the internal tube 238 can slide over the push rod 130. In an embodiment, the slide limiting mechanism includes the stopper element 244 which is fixed to an outer surface of the push rod 130 at a distal side of the internal tube 238. The stopper element 244 is configured to prevent the internal tube sliding past the first stopper element. For example, the stopper element 244 may be sized and/or shaped to prevent the internal tube 238 from sliding over it. The stopper element 244 may be a blob, drop, bead, or ball of adhesive (e.g. UV adhesive). As such, the stopper element 244 may surround only part of the circumference of the push rod 130. Alternatively, the stopper element 244 may be a small tubular portion which surrounds the push rod 130 circumference. Also, the slide limiting mechanism includes another stopper element fixed to the outer surface of the push rod 130 at a proximal side of the internal tube 238. As before, this other stopper element is configured to prevent the internal tube 238 sliding past it. In the present embodiment, the other stopper element is provided by the distal end of the support tube 248. As mentioned above, the support tube 248 is fixed to the push rod 130 and, therefore, limits sliding of the internal tube in the proximal direction. However, it is to be understood that in some other embodiments, a dedicated second stopper element may be included in-between the proximal end of the internal tube 238 and the distal end of the support tube 248. For example, the second stopper element may be like the stopper element 244.

A function of the slide limiting mechanism (e.g. stopper element 244 and the distal end of support tube 248) is to limit a maximum slide distance of the internal tube 238 over the push rod 130. For example, the maximum slide distance may be limited to between 4 mm and 10 mm. That is, if the internal tube 238 has a length of 2000 mm, then the two stopper elements of the slide limiting mechanism may fixed to the push rod 130 with a separation distance of between 2004 mm to 2010 mm. In this way, the internal tube 238 may slide by between 4 mm and 10 mm. Therefore, the internal tube 238 is able to slide over the push rod 130 in a constrained manner. An advantage of constrained sliding compared to unconstrained sliding is that the internal tube 238 is less likely to buckle, jam or tear on the needle ferrule 240, and cause issues with needle performance. Also, the internal tube 238 is able to move with the push rod 130 and, therefore, the internal tube 238 does not float as much on the push rod 130, thereby reducing wear due to friction along the push rod 130 (i.e. improving friction performance). Additionally, since the chance of damage to the internal tube 238 is reduced, the chance of damage to other parts of the system which are a result of a damaged internal tube 238 are also reduced.

It is to be understood that various embodiments of the invention may be particularly suitable in gastrointestinal (GI) procedures associated with the lower and upper GI tract, e.g. to remove polyps on the bowel, i.e. for endoscopic mucosal resection, or endoscopic submucosal dissection. The invention may also lend itself to other procedures, e.g. in general surgery or laparoscopic surgery. The invention may find use in ear, nose and throat procedures and liver resection. The invention may also be used to address procedures associated with the pancreas, e.g. to resect or remove tumours or abnormalities in close proximity to the portal vein or the pancreatic duct.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the words "have", "comprise", and "include", and variations such as "having", "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means, for example, +/−10%.

The words "preferred" and "preferably" are used herein refer to embodiments of the invention that may provide certain benefits under some circumstances. It is to be appreciated, however, that other embodiments may also be preferred under the same or different circumstances. The recitation of one or more preferred embodiments therefore does not mean or imply that other embodiments are not useful, and is not intended to exclude other embodiments from the scope of the disclosure, or from the scope of the claims.

The invention claimed is:

1. An interface joint for interconnecting an electrosurgical generator and an electrosurgical instrument, the interface joint comprising:
 a housing having:
  an inlet for receiving electromagnetic energy from the electrosurgical generator, and
  an outlet;
 a slidable trigger on the housing, the slidable trigger being attached to a push rod that extends out of the housing through the outlet;
 a single cable assembly for connecting the outlet to the electrosurgical instrument, the single cable assembly comprising a flexible sleeve that conveys the push rod and a coaxial cable that is connected to the inlet; and
 a reinforcement element coupled to a first portion of the push rod so as to reinforce the first portion, the first portion being located partly or completely inside the housing;
 wherein the flexible sleeve comprises an internal tube surrounding a second portion of the push rod, the internal tube being free to slide with respect to the push rod and the housing.

2. The interface joint of claim 1, wherein the reinforcement element is fixed to the first portion to prevent relative movement between the reinforcement element and the first portion.

3. The interface joint of claim 1, wherein the reinforcement element is a support tube surrounding the first portion.

4. The interface joint of claim 1, wherein the internal tube is a single lumen tube.

5. The interface joint of claim 1, further comprising a slide limiting mechanism coupled to the push rod and configured to limit a maximum slide distance of the internal tube over the push rod.

6. The interface joint of claim 5, wherein the slide limiting mechanism comprises a first stopper element fixed to an outer surface of the push rod at a distal side of the internal tube, the first stopper element being configured to prevent the internal tube sliding past the first stopper element.

7. The interface joint of claim 6, wherein the slide limiting mechanism comprises a second stopper element fixed to the outer surface of the push rod at a proximal side of the internal tube, the second stopper element being configured to prevent the internal tube sliding past the second stopper element.

8. The interface joint of claim 7, wherein the second stopper element is spaced from a distal end of the push rod.

9. The interface joint of claim 7, wherein first stopper element and the second stopper element are positioned with respect to each other such that the maximum slide distance of the internal tube over the push rod is 4 mm to 10 mm.

10. The interface joint of claim 7, wherein the reinforcement element comprises the second stopper element.

11. The interface joint according to claim 7, wherein the housing has a pistol like pistol shape with an upper barrel portion and a lower adjoining portion which extends away from a proximal end of the upper barrel portion,
 wherein the upper barrel portion comprises a slot in an outer surface thereof, and the slidable trigger is slidably fixed to the upper barrel portion so as to be slidable within the slot, the slidable trigger having an integral button portion outside the housing, and an integral elongate portion inside the housing, the button portion being smaller in length than the elongate portion, and
 wherein the slot is positioned towards the proximal end of the upper barrel portion, and wherein the button portion is positioned towards a proximal end of the elongate portion.

12. The interface joint of claim 11, wherein the upper barrel portion has a length of between 115 mm and 125 mm, and wherein the lower adjoining portion has a length of between 100 mm and 110 mm.

13. The interface joint of claim 11, wherein the slot has a length of between 54 mm to 58 mm, and a width of between 1.0 mm and 1.6 mm.

14. The interface joint of claim 1, wherein the flexible sleeve comprises a braided tube wrap mounted between a radially inner polymer layer and a radially outer polymer layer, the braided tube comprising two or more radially spaced layers of wrap mounted braided wire.

15. The interface joint of claim 14, wherein adjacent layers of the wrap mounted braided wire have opposite wrapping directions.

* * * * *